(12) United States Patent
Spitzer

(10) Patent No.: US 11,868,666 B1
(45) Date of Patent: Jan. 9, 2024

(54) SECURE, DISTRIBUTED RAID STORAGE SYSTEMS AND METHODS

(71) Applicant: CenturyLink Intellectual Property LLC, Broomfield, CO (US)

(72) Inventor: Steven A. Spitzer, Reston, VA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/808,016

(22) Filed: Jun. 21, 2022

(51) Int. Cl.
*G06F 3/06* (2006.01)

(52) U.S. Cl.
CPC .......... *G06F 3/0689* (2013.01); *G06F 3/0604* (2013.01); *G06F 3/0646* (2013.01)

(58) Field of Classification Search
None
See application file for complete search history.

(56) References Cited

U.S. PATENT DOCUMENTS

| | | | |
|---|---|---|---|
| 8,359,379 B1* | 1/2013 | Sen | H04L 61/2514 709/230 |
| 10,178,032 B1* | 1/2019 | Freitas | H04L 47/125 |
| 10,200,282 B1* | 2/2019 | Sidebottom | H04L 45/72 |
| 2016/0072764 A1* | 3/2016 | Arshinov | H04L 61/2557 709/245 |
| 2018/0167352 A1* | 6/2018 | Worley | H04L 69/22 |
| 2019/0182209 A1* | 6/2019 | Wink | H04L 45/54 |

* cited by examiner

*Primary Examiner* — Stephanie Wu

(57) ABSTRACT

Systems and methods for securely and remotely storing data in a remote, distributed redundant array of independent drives (RAID) is provided. RAID storage is accomplished through a series of mapped drives, non-routable Internet protocol (IP) addresses, and routable IP addresses. In addition, authorization to access a RAID controller, network address translation (NAT) system, and domain name system (DNS) system may all be separated, increasing security and allowing storage to be securely distributed among a variety of dispersed storage locations.

18 Claims, 8 Drawing Sheets

| Drive 1 | Non-Routable IP Address 1 |
|---------|---------------------------|
| Drive 2 | Non-Routable IP Address 2 |
| Drive 3 | Non-Routable IP Address 3 |
| Drive 4 | Non-Routable IP Address 4 |
| Drive 5 | Non-Routable IP Address 5 |
| Drive 6 | Non-Routable IP Address 6 |
| Drive 7 | Non-Routable IP Address 7 |
| Drive 8 | Non-Routable IP Address 8 |

Fig. 2A

| Non-Routable IP Address 1 | Routable IP Address 1 |
|---------------------------|-----------------------|
| Non-Routable IP Address 2 | Routable IP Address 2 |
| Non-Routable IP Address 3 | Routable IP Address 3 |
| Non-Routable IP Address 4 | Routable IP Address 4 |
| Non-Routable IP Address 5 | Routable IP Address 5 |
| Non-Routable IP Address 6 | Routable IP Address 6 |
| Non-Routable IP Address 7 | Routable IP Address 7 |
| Non-Routable IP Address 8 | Routable IP Address 8 |

Fig. 2B

| | |
|---|---|
| Non-Routable IP Address 1 | Domain 1 |
| Non-Routable IP Address 2 | Domain 2 |
| Non-Routable IP Address 3 | Domain 3 |
| Non-Routable IP Address 4 | Domain 4 |
| Non-Routable IP Address 5 | Domain 5 |
| Non-Routable IP Address 6 | Domain 6 |
| Non-Routable IP Address 7 | Domain 7 |
| Non-Routable IP Address 8 | Domain 8 |

Fig. 2C

| | | |
|---|---|---|
| First Storage Location 111 | | |
| | Routable IP Address 1 | Drive 1 |
| | Routable IP Address 5 | Drive 5 |
| Second Storage Location 112 | | |
| | Routable IP Address 2 | Drive 2 |
| | Routable IP Address 6 | Drive 6 |
| Third Storage Location 113 | | |
| | Routable IP Address 3 | Drive 3 |
| | Routable IP Address 7 | Drive 7 |
| Fourth Storage Location 114 | | |
| | Routable IP Address 4 | Drive 4 |
| | Routable IP Address 8 | Drive 8 |

SECURE, DISTRIBUTED RAID STORAGE SYSTEMS AND METHODS

BACKGROUND

Secure storage of sensitive data is becoming increasingly important and challenging. As the amount of data to be stored increases, data owners are incented to find storage solutions that are economically advantageous. However, owners of sensitive data (personal information, trade secrets, confidential information, etc.) are hesitant to store data in any facilities that are not controlled by the data owner or that are within trusted, secure physical locations. It is with respect to this general technical environment that aspects of the present application may be directed.

SUMMARY

The present application describes a method comprising: receiving, at a redundant array of independent drives (RAID) controller, a first set of data including at least first data and second data; determining, by the RAID controller, to store the first set of data in a plurality of data storage drives, including at least a first drive and a second drive; determining, by the RAID controller, a first non-routable IP address on a local area network (LAN) associated with the first drive and a second non-routable IP address on the LAN associated with the second drive; transmitting, by the RAID controller, the first data to the first non-routable IP address and the second data to the second non-routable IP address; receiving, by a network address translation (NAT) system, the first data addressed to the first non-routable IP address and the second data addressed to the second non-routable IP address; translating, by the NAT system, the first non-routable IP address into a first routable IP address for a first storage location and the second non-routable IP address into a second routable IP address for a second storage location; and sending, by the NAT system, the first data to the first routable IP address and the second data to the second routable IP address via a wide area network (WAN).

In other aspects, the present application describes a system comprising: at least one processor; and memory, operatively connected to the at least one processor and storing instructions that, when executed by the at least one processor, cause the system to perform a method. In examples, the method comprises: receiving, at a redundant array of independent drives (RAID) controller, a first set of data including at least first data and second data; determining, by the RAID controller, to store the first set of data in a plurality of data storage drives, including at least a first drive and a second drive; determining, by the RAID controller, a first non-routable IP address on a local area network (LAN) associated with the first drive and a second non-routable IP address on the LAN associated with the second drive; transmitting, by the RAID controller, the first data to the first non-routable IP address and the second data to the second non-routable IP address; receiving, by a network address translation (NAT) system, the first data addressed to the first non-routable IP address and the second data addressed to the second non-routable IP address; translating, by the NAT system, the first non-routable IP address into a first routable IP address for a first storage location and the second non-routable IP address into a second routable IP address for a second storage location; and sending, by the NAT system, the first data to the first routable IP address and the second data to the second routable IP address via a wide area network (WAN).

In other aspects, the present application describes a system comprising: at least one processor; and memory, operatively connected to the at least one processor and storing instructions that, when executed by the at least one processor, cause the system to perform a method. In examples, the method comprises: receiving, at a redundant array of independent drives (RAID) controller, a first set of data including at least first data and second data; determining, by the RAID controller, to store the first set of data in a plurality of data storage drives, including at least a first drive and a second drive; determining, by the RAID controller, a first non-routable IP address on a local area network (LAN) associated with the first drive and a second non-routable IP address on the LAN associated with the second drive; transmitting, by the RAID controller, the first data to the first non-routable IP address and the second data to the second non-routable IP address; receiving, by a network address translation (NAT) system, the first data addressed to the first non-routable IP address and the second data addressed to the second non-routable IP address; translating, by the NAT system, the first non-routable IP address into a first routable IP address for a first storage location and the second non-routable IP address into a second routable IP address for a second storage location; sending, by the NAT system, the first data to the first routable IP address and the second data to the second routable IP address via a wide area network (WAN); providing, by an access management system, permission to a first set of users to access the RAID controller; providing, by the access management system, permission to a second set of users to access the NAT system; and preventing, by the access management system, any user from being designated as a member of both of the first set of users and the second set of users.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 2A-2D are schematic representations of relationships between storage drives, non-routable IP addresses, and/or routable IP addresses that may be maintained by one or more elements of present systems.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Figure 1:
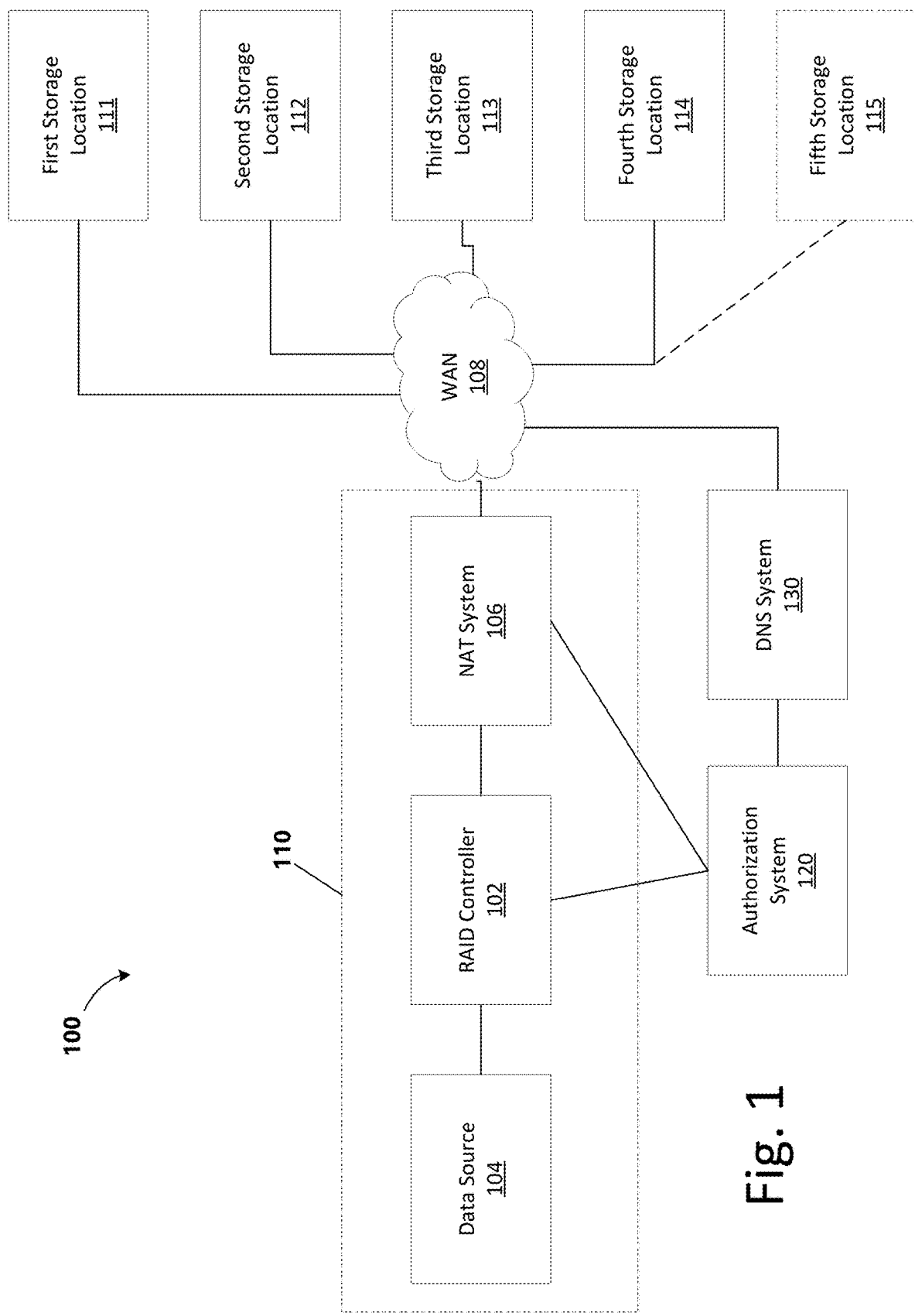
FIG. 1 is a block diagram depicting an example system according to aspects of the present application.

FIG. 1 discloses an example system 100 according to aspects of the present disclosure. In examples, system 100 includes a redundant array of independent drives (RAID) controller 102 that is communicatively connected to, or implemented as part of a data source computing system 104. Data source computing system 104 may comprise one or more computing devices, each with one or more processing units, that utilize the RAID controller 102 to store and retrieve data.

RAID is a storage virtualization technique that permits multiple physical disk drive components to be combined into one or more logical units. Data sets may be distributed across the disk drives in a variety of RAID schemas (or "levels") depending on the desired redundancy and/or performance characteristics. For example, RAID Level 0 uses "striping" to distribute data from a particular file across all drives in a set. This permits data to be read or written very quickly, as reads and writes are done concurrently. However, RAID Level 0 does not provide any redundancy. By contrast, RAID Level 1 does not use striping, but mirrors all data across two or more drives. Writing to drives with RAID Level 1 is generally slower than RAID Level 0, but redundancy is improved. As another example, RAID Level 10 combines RAID Level 1 and RAID Level 0 concepts and defines a striped set of data across a series of mirrored drives, providing increased redundancy and some read/write efficiencies as well. Multiple other RAID levels have been defined and are within the scope of the present disclosure.

RAID controllers, such as RAID controller 102, can be either hardware based or software based, or a combination thereof. For example, a hardware-based RAID controller may comprise a piece of computing hardware that is inserted in the peripheral component interconnect (PCI) slot of the motherboard of a computer. The hardware-based RAID controller may include its own processing unit that is dedicated only to implementing a chosen RAID architecture. The RAID controller 102 may also comprise a software-based RAID controller, which utilizes the capabilities of an operating system through a RAID application or driver installed on a computing device. In some examples, the RAID controller 102 may be implemented on the same computing device(s) as source computing system 104. In other examples, the RAID controller 102 may be implemented on a separate computing device that is communicatively coupled to the source computing system 104, e.g., via a local area network (LAN) 110.

In examples, RAID controllers, such as RAID controller 102, may be operatively connected to local storage drives or to storage drives in a network attached storage (NAS) server connected to the same network as the RAID controller. However, storing sensitive data locally provides little protection to information from any user that has access to the RAID controller and/or the physical location at which the LAN 110 is located. Also, storing data locally does not provide flexibility to take advantage of economically advantageous distributed storage locations.

In present examples, the RAID controller is also communicatively connected to a network address translation (NAT) system 106. In examples, NAT system 106 may take the form of a router or gateway device that translates non-routable IP addresses (i.e., addresses that are unique only on the LAN 110) into routable IP addresses that are globally unique on wide area network (WAN) 108 (such as Internet IP addresses assigned by the Internet Assigned Numbers Authority (IANA)). NAT system 106 may also be operable to route packets received from the WAN 108 to particular devices on LAN 110, such as RAID controller 102 and/or the data source computing system 104. In examples, the RAID controller 102 and NAT system 106 may be used to implement a RAID storage scheme to write and read data to/from multiple disks that are located in remote storage locations 111, 112, 113, and 114 over a WAN 108. The number of storage locations is depicted as four in FIG. 1; however, one of ordinary skill in the art will understand that more or fewer storage locations may be implemented. In addition, in some examples discussed below, a fifth storage location 115 may be included and/or instantiated as needed or desired.

Further, in some examples, NAT system 106 may be operatively connected to a domain name system (DNS) system 130 via WAN 108 or through one or more other communication networks or links. DNS system 130 may be operable to resolve a domain name resolution request from or through NAT system 106 for IP address(es) associated with remote storage locations 111, 112, 113, and 114.

In examples, an authorization system 120 is also communicatively coupled to at least the RAID controller 102 and NAT system 106. To the extent a DNS system 130 is employed, then the authorization system 120 may also be communicatively coupled to the DNS system 130. Authorization system 120 may, in examples, control access to each of the RAID controller 102, NAT system 106, and DNS system 130. In some examples, access includes access to configuration data, such as will be described hereinafter with respect to FIGS. 2A-2D. In examples, authorization system 120 may comprise separate computing device(s) for controlling configuration of the RAID controller 102, NAT system 106 and DNS system 130. In other examples, authorization system may comprise a single computing system. In some examples, the authorization system 120 may be operatively connected to the RAID controller 102 and NAT system 106 via LAN 110. In other examples, the authorization system 120 may be operatively connected to the RAID controller 102 and NAT system 106 via one or more separate networks or communication links. Further, the authorization system 120 may be operatively connected to the DNS system 130 via the WAN 108 or via one or more separate networks or communication links.

In operation, data source computing system 104 may generate new data to be stored. RAID controller 102 may, depending on particular needs of a user, be configured to implement one or more of the RAID storage schemas (or "levels"). For example, one or more users, applications, or processes (such as a timed backup) operating on data source computing system 104 may receive or generate a first set of data that is temporarily stored in memory at data source computing system 104. In some examples, the first set of data may comprise a file. A user may initiate a save operation (or the application or operating system may programmatically initiate a save operation) for the first set of data using RAID controller 102. According to whatever RAID level is being implemented by RAID controller 102, the first set of data may be divided into multiple stripes, or portions of the data, including at least first data, second data, third data, fourth data, etc. Depending on the implemented RAID level the RAID controller 102 will issue commands to cause the stripes (first data, second data, third data, fourth data . . . ) to be stored on separate storage drives. In some examples, the different stripes will also be mirrored onto different drives for redundancy. In examples, RAID controller 102 may stripe the data into small enough segments that if any one drive is compromised, the compromised drive will be of limited use in attempting to recreate the first set of data.

In examples, the RAID controller may maintain a mapping between the storage drives in which it seeks to store the first set of data and non-routable IP addresses. A simplified example of this configuration data is shown in FIG. 2A. For example, if the RAID controller 102 is attempting to store first data to the first drive, second data to the second drive, third data to the third drive, fourth data to the fourth drive, etc., the RAID controller 102 may map the different drives to non-routable IP addresses 1, 2, 3, and 4, respectively. In examples, non-routable IP addresses (IP addresses that are unique only on LAN 110) are provided (e.g., advertised) to the RAID controller 102 by the NAT system 106. The RAID controller 102 thus sends the first data (and a command, such as "write") to the first non-routable IP address, sends the second data to the second non-routable IP address, sends the third data to the third non-routable IP address, sends the fourth data to the fourth non-routable IP address, etc. As discussed, since some RAID levels require redundancy, in some instances the data comprising the first data, second data, third data, fourth data, etc. may overlap.

In examples, all of the non-routable IP addresses provided to the RAID controller 102 for the different drives may be resolved on LAN 110 to the NAT system 106. For example, the NAT system 106 may receive the first data in a packet addressed to the first non-routable IP address, receive the second data in a packet addressed to the second non-routable IP address, receive the third data in a packet addressed to the third non-routable IP address, and receive the fourth data in a packet addressed to the fourth non-routable IP address, etc. In addition, the write command from the RAID controller 102 may be included in each packet along with the respective data and include information about the drive to which the RAID controller 102 is seeking to write the data.

In examples, the NAT system 106 may maintain a mapping of the non-routable IP addresses to routable IP addresses, as shown in the simplified diagram of configuration data in FIG. 2B. The routable IP addresses, in examples, may comprise globally unique IP addresses on WAN 108 (such as Internet IP addresses assigned by the IANA). In examples, NAT system 106 may receive packets at the non-routable IP addresses from the RAID controller 102 and be configured to route the packet over the WAN 108 to the corresponding storage locations 111, 112, 113, 114. That is, the routable IP addresses may be assigned to respective storage locations 111, 112, 113, 114—e.g., routable IP address 1 is assigned to first storage location 111, routable IP address 2 is assigned to second storage location 112, routable IP address 3 is assigned to third storage location 113, and routable IP address 4 is assigned to fourth storage location 114. As such, NAT system 106 may maintain a mapping (as depicted in FIG. 2B) of non-routable IP addresses (mapped by the RAID controller to particular storage drives) to routable IP addresses assigned to remote, geographically dispersed storage locations 111, 112, 113, 114.

In other examples, the NAT system 106 may instead maintain a mapping of the non-routable IP addresses to particular domains (e.g., storagelocation1.com), as depicted in the simplified diagram of configuration data in FIG. 2C. The NAT system 106 may then, after receiving data addressed to a non-routable IP address, query a DNS system, such as DNS system 130, to resolve the domain name to a particular routable IP address for one of the remote, geographically dispersed storage locations 111, 112, 113, 114. Data is then forwarded to the storage locations 111, 112, 113, 114 using the resolved non-routable IP address(es) received from the DNS system 130. In examples, DNS system 130 may comprise a single DNS server or multiple DNS servers that cooperate to resolve the domain names to routable IP address(es).

For example, NAT system 106 may maintain a mapping to a different domain for each non-routable IP address, as shown in exemplary configuration data of FIG. 2C. DNS system 130 may then, in examples, maintain a mapping for each domain to the routable IP address(es) for the currently applicable storage location(s) 111, 112, 113, 114. The storage location(s) to which that domain is resolved can then be easily switched at the DNS system 130 when conditions warrant and without re-programming the NAT system 106 or RAID controller 102. For example, if the first storage location 111 is in a data center in London, UK, then DNS system 130 may maintain a mapping for domain 1 to a routable IP address for that London, UK, data center. If the London, UK, data center crashes or is subsequently deemed unsuitable (due to security, economic reasons, or otherwise, e.g.), assuming a RAID level that includes redundancy is being employed, then an administrator may cause replication of the data to the fifth storage location 115 in, e.g., Paris, France by changing the pointer in the DNS system for domain 1 to the routable IP address for the fifth storage location 115. In examples, once the first storage location 111 becomes unreachable and the RAID controller 102 discovers that the information that should be in "Drive 1" is no longer available (since the fifth storage location 115 will be initially empty), RAID controller 102 will automatically cause the information that should be in Drive 1 to be replicated to the fifth storage location 115 from the location(s) where that information has been mirrored in the RAID array (e.g., storage locations 112, 113, 114). An administrator can accomplish that switch in location by simply reprogramming configuration data of the DNS system 130 to map the domain 1 to a routable IP address for the fifth storage location 115 without any access to the NAT system 106.

In examples, once the NAT system 106 obtains a routable IP address, it can forward data that is sent to the NAT system 106 from the RAID controller 102 to the appropriate storage location(s) 111, 112, 113, 114. The storage location(s) 111, 112, 113, 114 may each comprise one or more storage devices including one or more storage drives. In some examples, multiple routable IP addresses at each storage location 111, 112, 113, 114 may each be mapped by the storage location(s) to a single drive, as shown in the configuration data of simplified FIG. 2D. For example, the first storage location 111 may receive the first data in a packet addressed to the first routable IP address. All data received that is addressed to that first routable IP address may be stored to a particular drive (of what may be many drives) of the first storage location 111 (e.g., Drive 1). Similarly, the second storage location 112 may receive the second data addressed to the second routable IP address. All data received and addressed to that second routable IP address may be stored to a particular drive (of what may be many drives) of the second storage location 112 (e.g., Drive 2). The third and fourth storage locations 113, 114 may be similarly configured. In addition, each storage location may advertise multiple routable IP addresses, each of which is mapped by a storage location to a particular storage drive. In addition, each of the drives may be identified as belonging to a particular RAID array. Other management schemes for storage requests routed on the routable IP addresses to the storage locations 111, 112, 113, and 114 are possible and included within the scope of this application.

As a nonexclusive example, when RAID controller 102 segments (e.g., stripes) a first data set to be stored on multiple drives, the RAID controller 102 may issue a command to write first data to what RAID controller 102 considers "Drive 1" and second data to what RAID controller 102 considers "Drive 2." The write command and accompanying first data may be packetized and sent by RAID controller 102 to non-routable IP address 1, and the write command and accompanying second data may be packetized and sent by RAID controller 102 to non-routable IP address 2. NAT system 106 may receive the write command and first data in one or more packet(s) addressed to non-routable IP address 1 on LAN 110. NAT system 106 may also receive the write command and second data in one or more packet(s) addressed to non-routable IP address 2 on LAN 110. NAT system 106 may then obtain routable IP addresses either by directly mapping the non-routable IP address 1 and non-routable IP address 2 to routable IP address 1 and routable IP address 2, or by querying DNS system 130 for resolution of domain 1 and domain 2, which returns routable IP address 1 and routable IP address 2, respectively. NAT system 106 may then route the packetized write command and accompanying first data to the routable IP address 1, which may be then received at first storage location 111. NAT system 106 may then route the packetized write command and accompanying second data to the routable IP address 2, which may be then received at second storage location 112. Storage location 111 may then write the first data to a Drive 1 associated with the routable IP address 1. Storage location 112 may then write the second data to a Drive 2 associated with the routable IP address 2. Writes to other storage drives at third storage location 113 and fourth storage location 114 may be similarly accomplished.

Reads from storage locations 111, 112, 113, and 114 may be performed similarly. For example, RAID controller 102 may issue a read command for the first data to what it considers a "first drive" and a read command for the second data to what it considers a "second drive." The read command for the first data is packetized and sent to the first non-routable IP address, and the read command for the second data is packetized and sent to the second non-routable IP address. NAT system 106 may receive the first read command for the first data in a packet addressed to non-routable IP address 1 on LAN 110. NAT system 106 may also receive the second read command for the second data in a packet addressed to non-routable IP address 2 on LAN 110. NAT system 106 may then obtain routable IP addresses either by directly mapping the non-routable IP address 1 and non-routable IP address 2 to routable IP address 1 and routable IP address 2, or by querying DNS system 130 for resolution of domain 1 and domain 2, which returns routable IP address 1 and routable IP address 2, respectively. NAT system 106 may then route the packetized read command for the first data to the routable IP address 1, which may be then received at first storage location 111. NAT system 106 may then route the packetized read command for the second data to the routable IP address 2, which may be then received at second storage location 112. Storage location 111 may then read the first data from the Drive 1 associated with the routable IP address 1. Storage location 112 may then read the second data from the Drive 2 associated with the routable IP address 2.

First storage location 111 may then return the first data in packet(s) addressed to the NAT system 106, which then sends the first data back to the RAID controller 102. Similarly, second storage location 112 may then return the second data in packet(s) addressed to the NAT system 106, which then sends the second data back to the RAID controller 102. In examples, the NAT system 106 may maintain a separate routable IP address corresponding to each storage location 111, 112, 113, 114. That is, packets to the NAT system 106 may be addressable to different routable IP addresses by each of the storage locations 111, 112, 113, 114 (or, in examples, each individual drive within each of storage locations 111, 112, 113, 114). For example, NAT system 106 may use such a routable IP address as the source address for sending any read commands to the storage locations 111, 112, 113, 114. Similarly, the RAID controller 102 may maintain separate non-routable IP address(es) for each corresponding non-routable IP address of the NAT system 106. RAID controller 102 can thus use the corresponding non-routable IP address as the source address for any read commands to the NAT system 106 so that when the response to the read command is sent back from the NAT system 106 to the RAID controller 102, the RAID controller 102 can differentiate the drive to which the read command was issued. In this way, information (such as the first and second data returned in reads from first storage location 111 and second storage location 112) may be properly routed on LAN 110 by NAT system 106 and interpreted by the RAID controller 102. Reads from other storage drives at third storage location 113 and fourth storage location 114 may be similarly accomplished.

Figure 3:
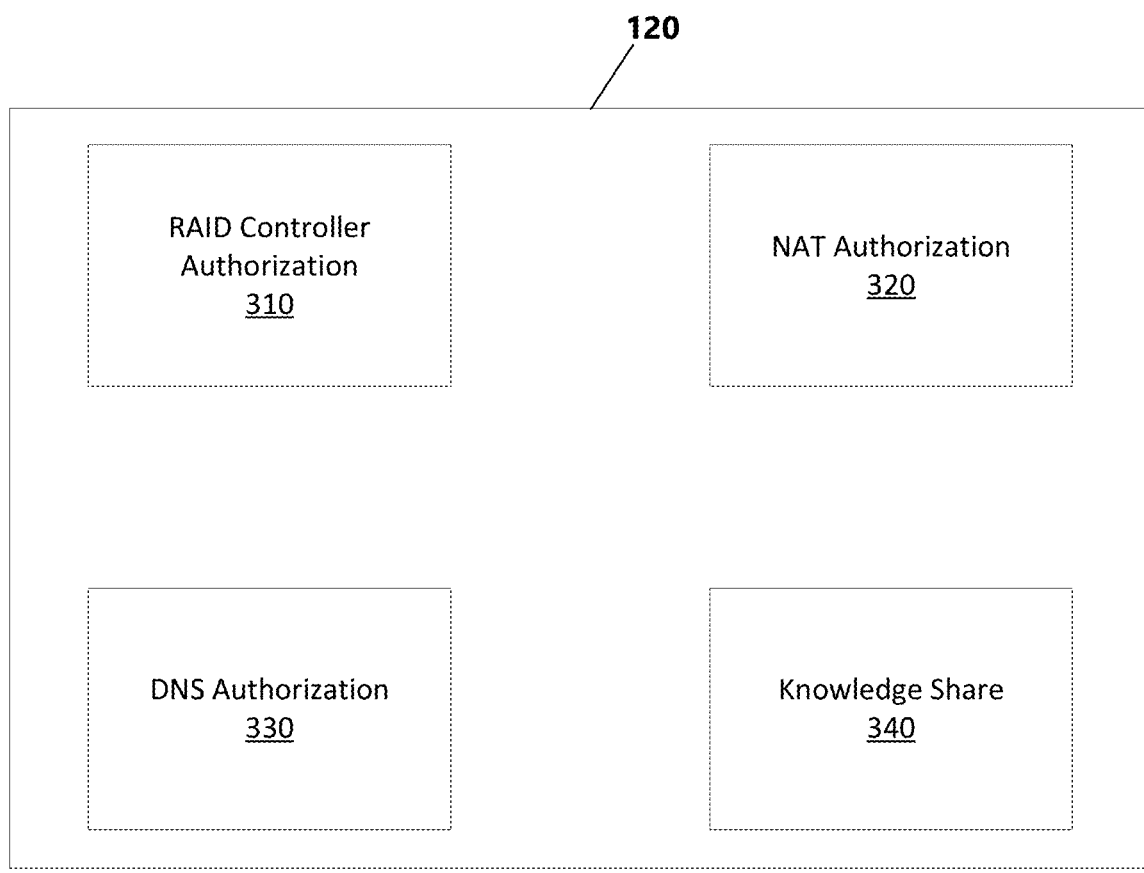
FIG. 3 is a block diagram depicting an example authorization system according to aspects of the present application.

In examples, authorization system 120 may be configured to prevent any one user from having access to both the RAID controller 102 and the NAT system 106. To the extent a DNS system 130 is employed, then the authorization system 120 may also be configured to prevent any user from having access to DNS system 130 that has access to either of RAID controller 102 or NAT system 106. For example, as depicted in the example of FIG. 3, authorization system 120 may comprise a RAID controller authorization system 310, a NAT authorization system 320, a DNS authorization system 330, and a knowledge share 340. Other implementations are possible. In examples, RAID controller authorization system 310 provides authorization services to enable or disable credentials and provide or deny access to RAID controller 102 (including any configuration data for RAID controller 102). NAT authorization system 320 provides authorization services to enable or disable credentials and provide or deny access to NAT system 106 (including any configuration data for NAT system 106). DNS authorization system 330 provides authorization services to enable or disable credentials and provide or deny access to DNS system 130 (including any configuration data for DNS system 130).

In the depicted example, each of the RAID controller authorization system 310, NAT authorization system 320, and DNS authorization system 330 may be operatively connected to a knowledge base 340. Knowledge base 340 may comprise a separate storage system that stores a unified set of user identifiers and a flag or other marker indicating whether the user is an active user of any of the protected systems 102, 106, 130. For example, knowledge share 340 may store a list of all current users (e.g., administrators) of any of the RAID controller 102, NAT system 106, and DNS system 130. In examples, each of the RAID controller 102, NAT system 106, and DNS system 130 utilizes a consistent user identifier that cannot be easily fabricated. For example, each system may use a social security number that must be verified (at an authentication stage) before a new user can be added to any of the RAID controller 102, NAT system 106, and DNS system 130.

In examples, when any of the RAID controller authorization system 310, NAT authorization system 320, or DNS authorization system 330 is requested by its respective protected system 102, 106, 130 to add a new user, it is configured to first query the knowledge share 340 to determine whether that potential new user (e.g., identified by the unique user identifier, such as a social security number) is already a current user of one of the other two systems. That is, if RAID controller authorization system 310 receives a request to add User 1 as a new administrator, RAID controller 310 may query knowledge share 340 to determine if User 1 is already an authorized user of either NAT system 106 or DNS system 130. In some examples, the knowledge base 340 does not distinguish between users of different systems—only keeping track of whether a user is already a user of any of the protected systems 102, 106, 110. If so, the request is denied. Otherwise, User 1 is added as an authorized user of RAID controller 102, and RAID controller authorization system 310 may send an update to knowledge share 340 to indicate that User 1 is now an authorized user of RAID controller 102 (or of a protected system in general, if the knowledge base does not differentiate between protected systems 102, 106, 130). NAT authorization system 320 and DNS authorization system 330 can be similarly programmed to ensure that no user is authorized as a user of more than one of the three systems (RAID controller 102, NAT system 106, DNS system 130).

In examples, the full user list maintained by knowledge share 340 may not be accessible to any of RAID controller authorization system 310, NAT authorization system 320, or DNS authorization system 330. Rather, knowledge share 340 may comprise one or more APIs that allows the RAID controller authorization system 310, NAT authorization system 320, or DNS authorization system 330 to query only whether a particular user is already a user of another (or any one) of the protected systems 102, 106, 130. The API may also permit the RAID controller authorization system 310, NAT authorization system 320, or DNS authorization system 330 to update the knowledge share 340 when a new user is added. Further, in examples, knowledge share 340 does not store any credentials issued by any of RAID controller authorization system 310, NAT authorization system 320, or DNS authorization system 330 for their individual protected systems 102, 106, 130. As such, if knowledge share 340 is compromised, the information obtained is not useful in gaining unauthorized access to any of the protected systems.

In examples, the API(s) of the knowledge share may also permit RAID controller authorization system 310, NAT authorization system 320, and DNS authorization system 330 to update knowledge share 340 when credentials for a user have been removed from a protected system 102, 106, 130. In some examples, the knowledge share may maintain the user on the list of current users for a period of time following receipt of a message that the user's credentials for a protected system have been deleted. This may help prevent a malevolent actor from serially adding and deleting a single user of each of the protected systems 102, 106, 130 so that the user can gain knowledge of each system. In examples, the period of time may be based on (and longer than) an interval during which the non-routable IP addresses, routable IP addresses, and/or domains assigned to the various protected systems 102, 106, 130, 111, 112, 113, 114 are changed, which may be done periodically to maintain security.

Figure 4A:
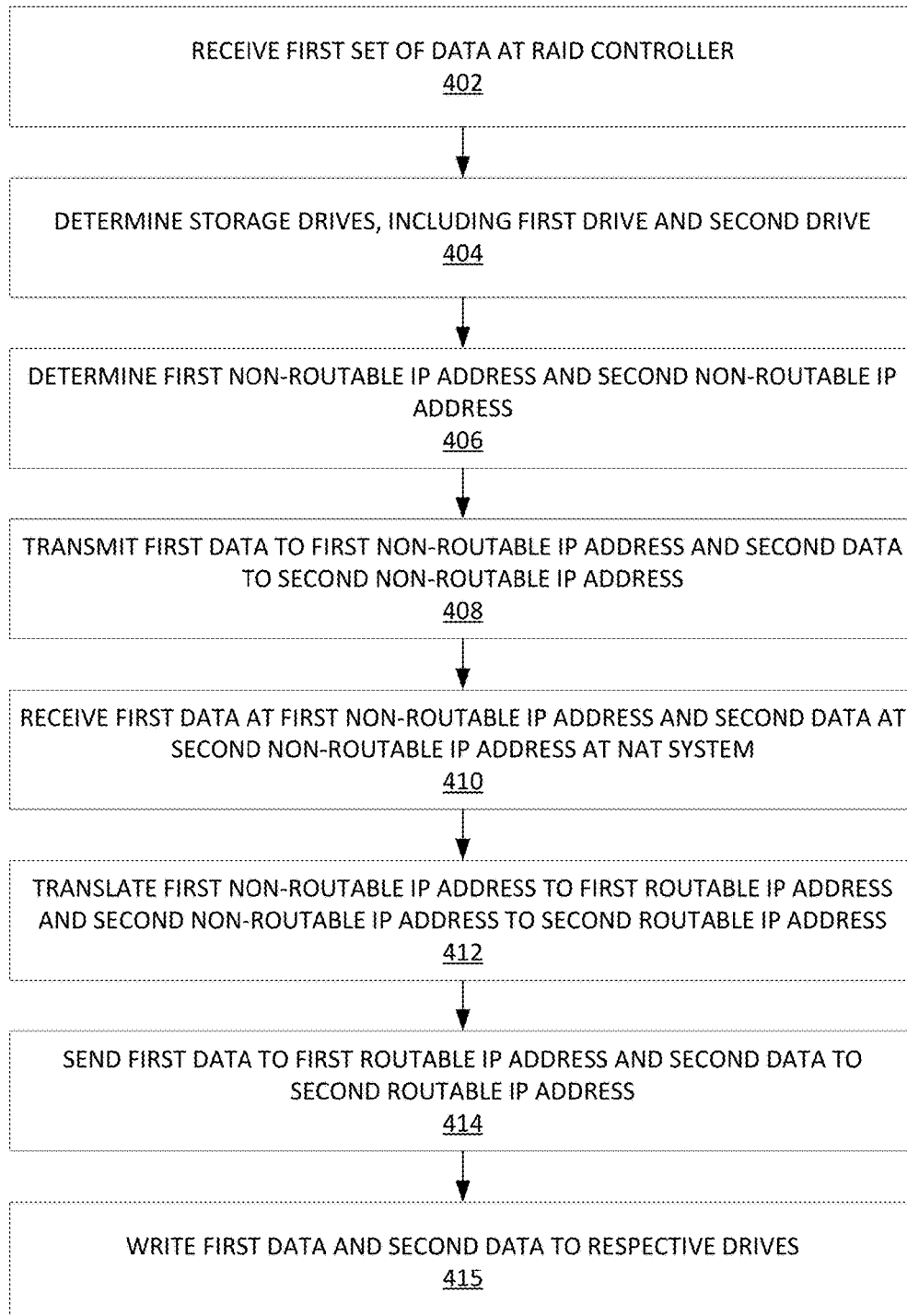
FIGS. 4A and 4B illustrate an example method for writing and reading data stored according to aspects of the present application.
Figure 4B:
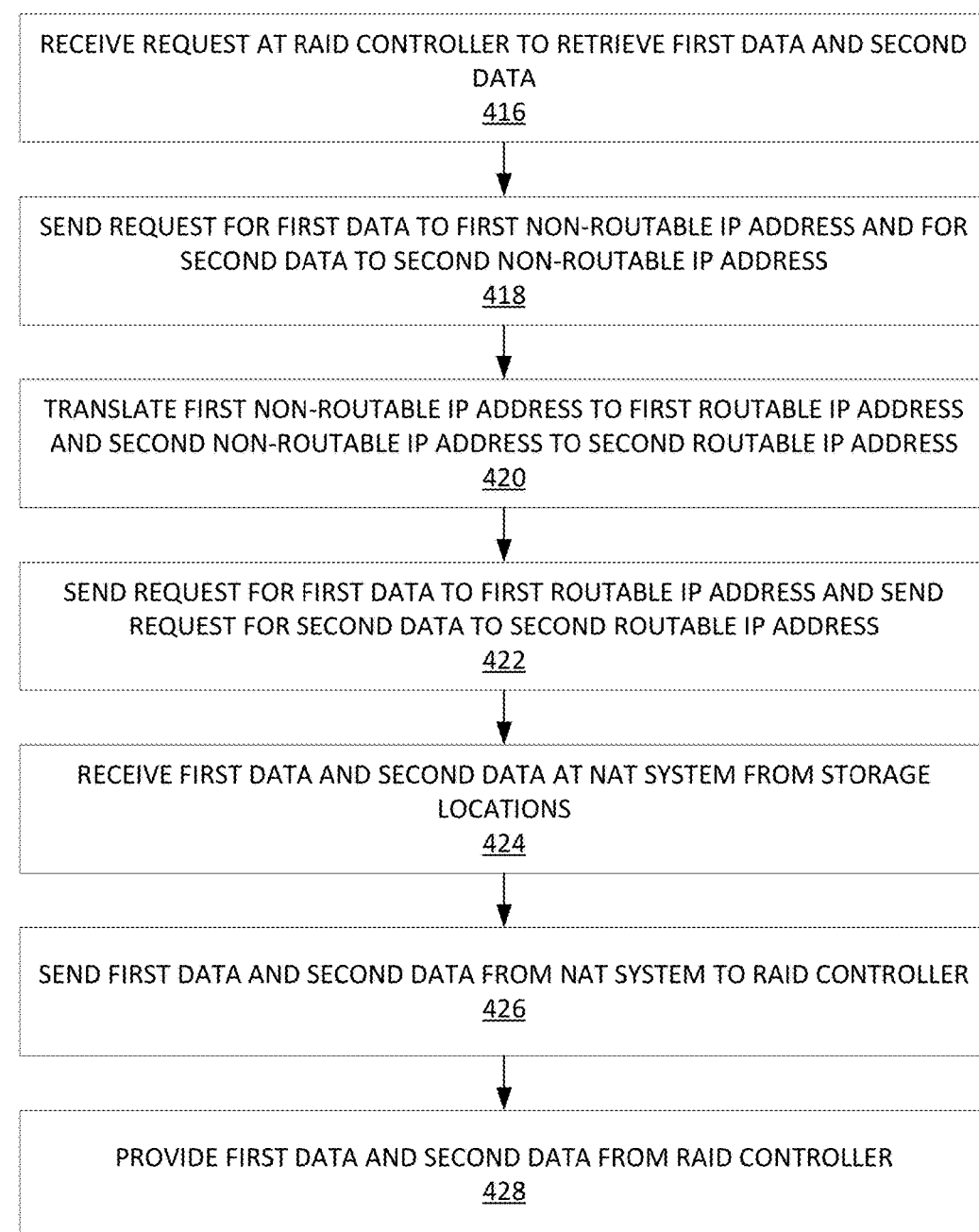

FIGS. 4A and 4B depict an example method 400 according to aspects of the present application. In examples, one or more of the operations of FIGS. 4A and 4B may be performed by a RAID controller and/or a NAT system, such as RAID controller 102 and/or NAT system 106. At operation 402, a first set of data including at least first data and second data is received at a RAID controller. For example, the first set of data may be received from data source 104 at RAID controller 102 with an indication that the first set of data should be stored.

At operation 404, RAID controller determines to store the first set of data in a plurality of data storage drives, including at least a first drive and a second drive. For example, the RAID controller 102 may be configured to store data across a set of multiple storage drives in a RAID array according to a RAID schema or level. Such determination may be made by RAID controller 102 in response to a "save" command received from data source 104.

Flow may proceed to operation 406, where the RAID controller may determine a first non-routable IP address on a local area network (LAN) associated with the first drive and a second non-routable IP address on the LAN associated with the second drive. For example, as discussed, RAID controller 102 may store a mapping between storage drives (as recognized by RAID controller 102 as part of a RAID array) and non-routable IP addresses mapped to such drives. As discussed each of the first drive and the second drive may have an individual, non-routable IP address associated with it.

At operation 408, the RAID controller may transmit the first data to the first non-routable IP address and the second data to the second non-routable IP address. In examples, RAID controller 102 may packetize a write command and the first data into one or more first packet(s) that are sent to the first non-routable IP address on LAN 110. RAID controller 102 may also packetize a write command and the first data into one or more second packet(s) that are sent to the second non-routable IP address on LAN 110. In some examples, the write command may include information about the drive delineated by RAID controller 102 for that write. Operation 408 may also comprise the RAID controller segregating (e.g., striping) the first set of data into the first data and the second data, pursuant to whatever RAID storage schema or level is being implemented by RAID controller 102.

At operation 410, the first data is received by a NAT system at the first non-routable IP address and the second data is received by the NAT system at the second non-routable IP address. In examples, each of the first and second non-routable IP addresses on LAN 110 are advertised by NAT system 106, so the packets containing each of the first data and the second data are received by NAT system 106.

At operation 412, the NAT system translates the first non-routable IP address into a first routable IP address for a first storage location and the second non-routable IP address into a second routable IP address for a second storage location. As discussed, NAT system 106 may maintain a mapping of each non-routable IP address to a routable IP address associated with a remote storage location 111, 112, 113, 114 on WAN 108. In some examples, operation 412 may comprise the NAT system 106 querying DNS system 130 for the applicable routable IP addresses based on a domain name mapped to each of the non-routable IP addresses maintained by the NAT system 106.

At operation 414, the NAT system sends the first data to the first routable IP address and the second data to the second routable IP address via a WAN. For example, as discussed, the NAT system 106 may transmit the first data to the first storage location 111 and the second data to the second storage location 112 using the first and second routable IP addresses, respectively. In examples, operation 414 includes sending the write command(s) from the RAID controller 102 with the first and second data, including information about the drive(s) to which the RAID controller 102 is writing the first and second data. The first and second data may then be written 415 to respective drives at the first storage location 111 and the second storage location 112, as discussed.

In FIG. 4B, flow continues with operation 416, the RAID controller receives a request to retrieve the first data and the second data. For example, an application at the data source 104 may make a request for the first set of data, which may comprise a file. RAID controller 102 may receive the request and determine that the first set of data has been striped between two drives and the request for the first set of data requires retrieval of the first data from the first drive and the second data from the second drive. It will be understood that the number of two drives is only used for explanatory purposes, and the first data set may be striped and stored among many drives.

At operation 418, the RAID controller may send a request for the first data to the first non-routable IP address and a request for the second data to the second non-routable IP address. For example, the RAID controller 102 may determine that the first data and the second data had been written to the first drive and the second drive and determine the non-routable IP address for the first drive and the second drive, respectively. Requests to read the first data and the second data are then sent by the RAID controller 102 to the first and second non-routable IP addresses, respectively.

At operation 420, the NAT system may translate the first non-routable IP address into the first routable IP address for the first storage location and the second non-routable IP address into the second routable IP address for the second storage location. As discussed, the translation by NAT system 106 may comprise querying a mapping of the non-routable IP addresses to routable IP addresses maintained by the NAT system 106 and/or querying a DNS system 130 for the routable IP addresses.

At operation 422, the NAT system may send the request for the first data to the first routable IP address and the request for the second data to the second routable IP address via the wide area network (WAN). For example, NAT system 106 may send a packetized read request for the first data to the first storage location 111 at the first routable IP address and a packetized read request for the second data to the second storage location 112 at the second routable IP address. In examples, the read request(s) may include information identifying the drive of the RAID array to which the read request applies.

At operation 424, the NAT system receives the first data and the second data. For example, a response to the first read request may be routed by the first storage location 111 back to NAT system 106 at a routable IP address for NAT system 106 that was included as the source address in the first read request. A response to the second read request may be routed by the second storage location 112 back to NAT system 106 at another routable IP address for NAT system 106 that was included as the source address in the second read request.

At operation 426, the NAT system may send the first data and the second data to the RAID controller. For example, the NAT system 106 may address the packet(s) with the first data back to the RAID controller 102 to a non-routable IP address for the RAID controller that was included as the source address in the original read request from the RAID controller to the NAT system 106 for the first data. Similarly, the NAT system 106 may address the packet(s) with the second data back to the RAID controller 102 to another non-routable IP address for the RAID controller that was included as the source address in the original read request from the RAID controller to the NAT system 106 for the second data.

At operation 428, the RAID controller may then provide the first and second data. For example, the RAID controller may provide the first set of data (including the first data and the second data) to the data source 104 that requested it.

Figure 5:
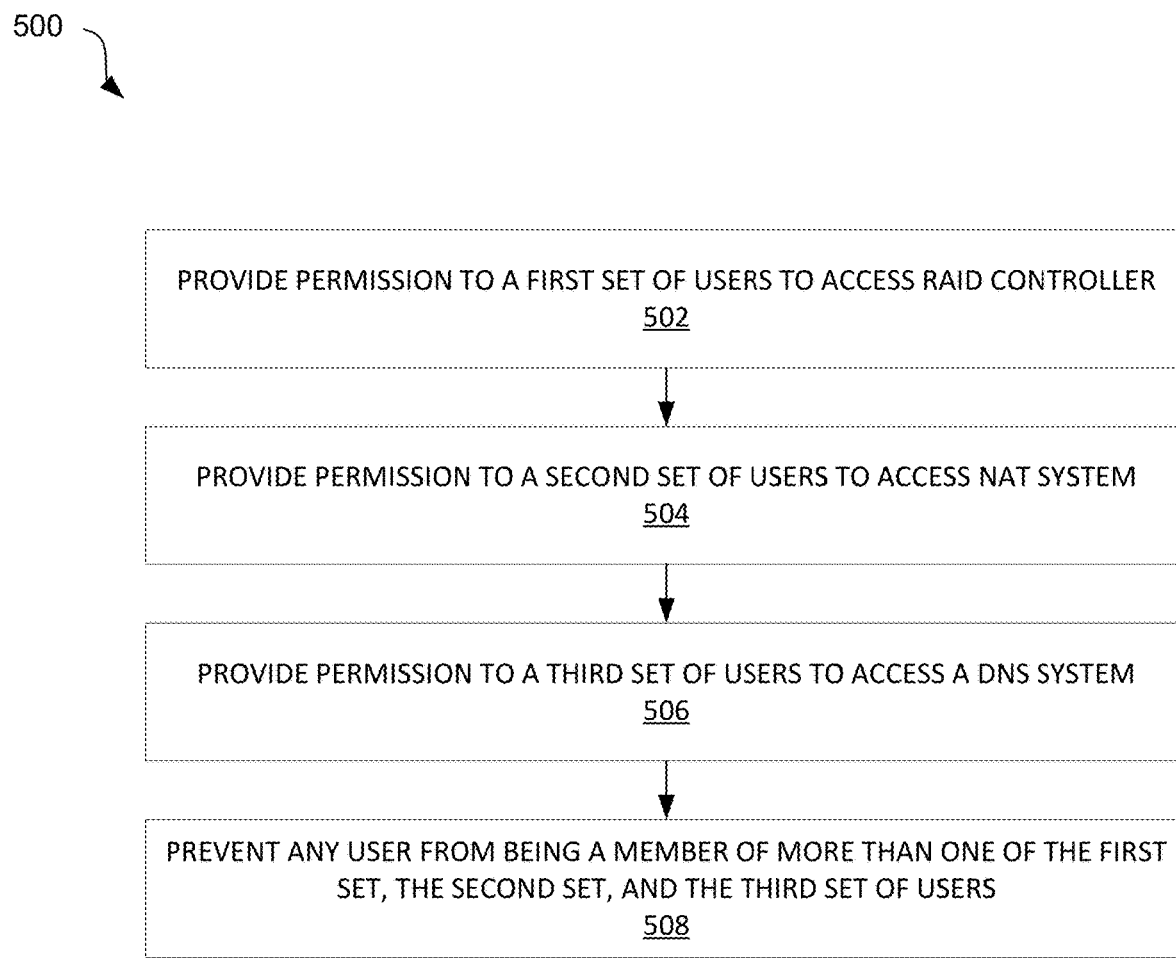
FIG. 5 is an example method for managing authorization systems according to aspects of the present application.

FIG. 5 depicts an example method 500 for controlling access to protected systems according to examples of the present application. In examples, one or more of the operations of method 500 may be performed by an authorization system, such as authorization system 120. At operation 502, an access management system provides permission to a first set of users to access a RAID controller. For example, RAID controller authorization system 310 may provide access to a first set of authorized users (e.g., administrators) to control operations of RAID controller 102. In examples, RAID controller authorization system 310 may update knowledge share 340 with a list of users that RAID controller authorization system 310 has provided access.

At operation 504, the access management system may provide permission to a second set of users to access a NAT system. For example, NAT authorization system 320 may provide access to a second set of authorized users (e.g., administrators) to control operations of NAT system 106. In examples, NAT authorization system 320 may update knowledge share 340 with a list of users that NAT authorization system 320 has provided access.

At operation 506, the access management system may provide permission to a third set of users to access a DNS system. For example, DNS authorization system 330 may provide access to a third set of authorized users (e.g., administrators) to control operations of DNS system 130. In examples, DNS authorization system 330 may update knowledge share 340 with a list of users that DNS authorization system 330 has provided access.

At operation 508, access to more than one protected system may be prevented. For example, authorization system 120 may prevent access by any user to more than one of RAID controller 102, NAT system 106, and DNS system 130. As discussed, this may be accomplished by requiring that each of RAID controller authorization system 310, NAT authorization system 320, and DNS authorization system 330 update a knowledge share 340 whenever a new user is added. In addition, each of RAID controller authorization system 310, NAT authorization system 320, and DNS authorization system 330 may be configured to check with knowledge share 340 to ensure that the new user being added is not already a current user of one of the protected systems before granting access to the user. In some examples, a user is documented at knowledge share 340 as a current user for a period of time even after that user's credentials have been revoked by the authorization system 310, 320, or 330 that previously issued the credentials.

Figure 6:
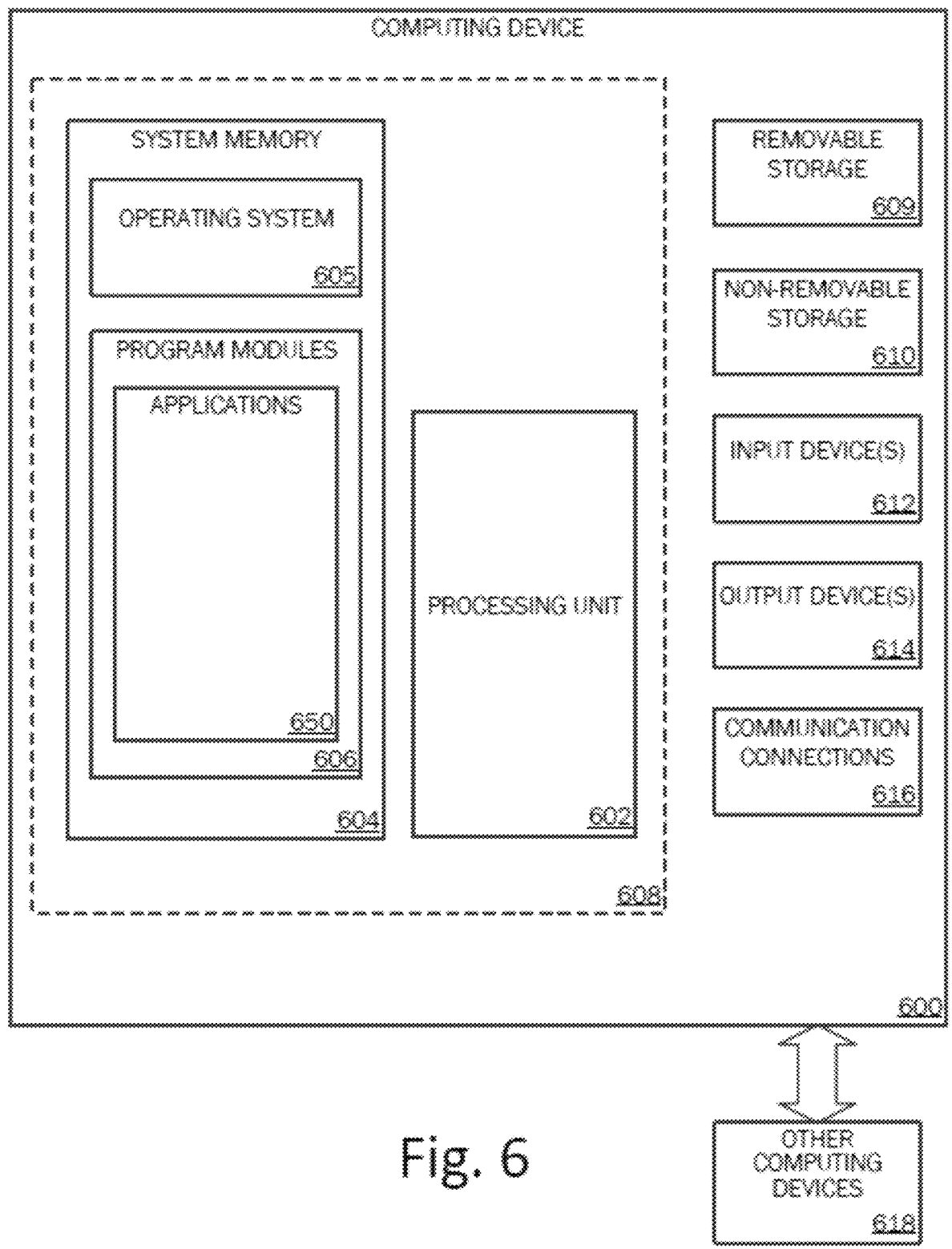
FIG. 6 is a block diagram of an example computing system that can be employed in relation to the present application.

FIG. 6 is a block diagram illustrating physical components (i.e., hardware) of a computing device 600 with which examples of the present disclosure may be practiced. The computing device components described below may be suitable for a computing device(s) implementing one or more of the RAID controller 102, data source system 104, NAT system 106, authorization system 120, DNS system 130, first storage location 111, second storage location 112, third storage location 113, fourth storage location 114, or other components of FIGS. 1 and 3. In a basic configuration, the computing device 600 may include at least one processing unit 602 and a system memory 604. The processing unit(s) (e.g., processors) may be referred to as a processing system. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650 to implement one or more of the systems described above with respect to FIGS. 1-3.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, one or more of the operations of the methods illustrated in FIGS. 4-5. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method, comprising:
   receiving, at a redundant array of independent drives (RAID) controller, a first set of data including at least first data and second data;
   determining, by the RAID controller, to store the first set of data in a plurality of data storage drives, including at least a first drive and a second drive;
   determining, by the RAID controller, a first non-routable IP address on a local area network (LAN) associated with the first drive and a second non-routable IP address on the LAN associated with the second drive;
   transmitting, by the RAID controller, the first data to the first non-routable IP address and the second data to the second non-routable IP address;
   receiving, by a network address translation (NAT) system, the first data addressed to the first non-routable IP address and the second data addressed to the second non-routable IP address;
   translating, by the NAT system, the first non-routable IP address into a first routable IP address for a first storage location and the second non-routable IP address into a second routable IP address for a second storage location;
   sending, by the NAT system, the first data to the first routable IP address and the second data to the second routable IP address via a wide area network (WAN);
   providing, by an access management system, permission to a first set of users to access the RAID controller;
   providing, by the access management system, permission to a second set of users to access the NAT system; and
   preventing, by the access management system, any user from being designated as a member of both of the first set of users and the second set of users.

2. The method of claim 1, further comprising:
   receiving, by the RAID controller, a request to retrieve the first data and the second data;
   sending, by the RAID controller, a request for the first data to the first non-routable IP address;
   sending, by the RAID controller, a request for the second data to the second non-routable IP address;
   translating, by the NAT system, the first non-routable IP address into the first routable IP address for the first storage location and the second non-routable IP address into the second routable IP address for the second storage location;
   sending, by the NAT system, the request for the first data to the first routable IP address and the request for the second data to the second routable IP address via the wide area network (WAN);
   receiving, by the NAT system, the first data and the second data;
   sending, by the NAT system, the first data and the second data to the RAID controller; and
   providing, by the RAID controller, the first data and the second data.

3. The method of claim 1, further comprising:
   determining, by the NAT system, a first domain name associated with the first non-routable IP address;
   determining, by the NAT system, a second domain name associated with the second non-routable IP address;
   sending, by the NAT system to a domain name service (DNS) system, a request to resolve the first and second domain names to routable IP addresses; and
   receiving, from the DNS system at the NAT system, the first and second routable IP addresses.

4. The method of claim 3, further comprising:
   changing a location of at least a first data storage location of the data storage locations by editing the first routable IP address associated with the first domain.

5. The method of claim 1, further comprising:
   providing, by the access management system, permission to a third set of users to access the DNS system; and
   preventing, by the access management system, any user from being designated as a member of any two of the first set of users, the second set of users, and the third set of users.

6. The method of claim 1, wherein preventing any user from being designated as a member of both of the first set of users and the second set of users comprises: providing a knowledge share between a RAID authorization system providing authorization services for the RAID controller and a NAT authorization system providing authorization services for the NAT system; receiving, at one of the RAID authorization system or the NAT authorization system, a request to grant access to a new user; querying the knowledge share to determine whether the new user is a current user of at least one of the RAID controller or the NAT system; when the new user is determined to be a current user of at least one of the RAID controller or the NAT system, denying the request to grant access to the new user.

7. The method of claim 6, further comprising:
   receiving, by the knowledge share, a notification that the RAID authorization system has revoked access of a first user in the first set of users to the RAID controller; and
   maintaining, by the knowledge share, the first user as a current user until expiration of a preset period of time after receiving the notification.

8. A system, comprising:
   at least one processor; and
   memory, operatively connected to the at least one processor and storing instructions that, when executed by the at least one processor, cause the system to perform a method, the method comprising:
   receiving, at a redundant array of independent drives (RAID) controller, a first set of data including at least first data and second data;
   determining, by the RAID controller, to store the first set of data in a plurality of data storage drives, including at least a first drive and a second drive;
   determining, by the RAID controller, a first non-routable IP address on a local area network (LAN) associated with the first drive and a second non-routable IP address on the LAN associated with the second drive;
   transmitting, by the RAID controller, the first data to the first non-routable IP address and the second data to the second non-routable IP address;
   receiving, by a network address translation (NAT) system, the first data addressed to the first non-routable IP address and the second data addressed to the second non-routable IP address;

translating, by the NAT system, the first non-routable IP address into a first routable IP address for a first storage location and the second non-routable IP address into a second routable IP address for a second storage location;

sending, by the NAT system, the first data to the first routable IP address and the second data to the second routable IP address via a wide area network (WAN);

providing, by an access management system, permission to a first set of users to access the RAID controller;

providing, by the access management system, permission to a second set of users to access the NAT system; and preventing, by the access management system, any user from being designated as a member of both of the first set of users and the second set of users.

9. The system of claim 8, wherein the method further comprises:

receiving, by the RAID controller, a request to retrieve the first data and the second data;

sending, by the RAID controller, a request for the first data to the first non-routable IP address;

sending, by the RAID controller, a request for the second data to the second non-routable IP address;

translating, by the NAT system, the first non-routable IP address into the first routable IP address for the first storage location and the second non-routable IP address into the second routable IP address for the second storage location;

sending, by the NAT system, the request for the first data to the first routable IP address and the request for the second data to the second routable IP address via the wide area network (WAN);

receiving, by the NAT system, the first data and the second data;

sending, by the NAT system, the first data and the second data to the RAID controller; and providing, by the RAID controller, the first data and the second data.

10. The system of claim 8, wherein the method further comprises:

determining, by the NAT system, a first domain name associated with the first non-routable IP address;

determining, by the NAT system, a second domain name associated with the second non-routable IP address;

sending, by the NAT system to a domain name service (DNS) system, a request to resolve the first and second domain names to routable IP addresses; and receiving, from the DNS system at the NAT system, the first and second routable IP addresses.

11. The system of claim 10, wherein the method further comprises:

changing a location of at least a first data storage location of the data storage locations by editing the first routable IP address associated with the first domain.

12. The system of claim 8, wherein the method further comprises:

providing, by the access management system, permission to a third set of users to access the DNS system; and preventing, by the access management system, any user from being designated as a member of any two of the first set of users, the second set of users, and the third set of users.

13. The system of claim 8, wherein preventing any user from being designated as a member of both of the first set of users and the second set of users comprises: providing a knowledge share between a RAID authorization system providing authorization services for the RAID controller and a NAT authorization system providing authorization services for the NAT system; receiving, at one of the RAID authorization system or the NAT authorization system, a request to grant access to a new user; querying the knowledge share to determine whether the new user is a current user of at least one of the RAID controller or the NAT system; when the new user is determined to be a current user of at least one of the RAID controller or the NAT system, denying the request to grant access to the new user.

14. The system of claim 13, wherein the method further comprises:

receiving, by the knowledge share, a notification that the RAID authorization system has revoked access of a first user in the first set of users to the RAID controller; and maintaining, by the knowledge share, the first user as a current user until expiration of a preset period of time after receiving the notification.

15. A system, comprising:

at least one processor;

memory, operatively connected to the at least one processor and storing instructions that, when executed by the at least one processor, cause the system to perform a method, the method comprising:

receiving, at a redundant array of independent drives (RAID) controller, a first set of data including at least first data and second data;

determining, by the RAID controller, to store the first set of data in a plurality of data storage drives, including at least a first drive and a second drive;

determining, by the RAID controller, a first non-routable IP address on a local area network (LAN) associated with the first drive and a second non-routable IP address on the LAN associated with the second drive;

transmitting, by the RAID controller, the first data to the first non-routable IP address and the second data to the second non-routable IP address;

receiving, by a network address translation (NAT) system, the first data addressed to the first non-routable IP address and the second data addressed to the second non-routable IP address;

translating, by the NAT system, the first non-routable IP address into a first routable IP address for a first storage location and the second non-routable IP address into a second routable IP address for a second storage location;

sending, by the NAT system, the first data to the first routable IP address and the second data to the second routable IP address via a wide area network (WAN);

providing, by an access management system, permission to a first set of users to access the RAID controller;

providing, by the access management system, permission to a second set of users to access the NAT system; and preventing, by the access management system, any user from being designated as a member of both of the first set of users and the second set of users.

16. The system of claim 15, wherein preventing any user from being designated as a member of both of the first set of users and the second set of users comprises:

providing a knowledge share between a RAID authorization system providing authorization services for the RAID controller and a NAT authorization system providing authorization services for the NAT system;

receiving, at one of the RAID authorization system or the NAT authorization system, a request to grant access to a new user;

querying the knowledge share to determine whether the new user is a current user of at least one of the RAID controller or the NAT system;

when the new user is determined to be a current user of at least one of the RAID controller or the NAT system, denying the request to grant access to the new user.

17. The system of claim 16, wherein the method further comprises:

receiving, by the knowledge share, a notification that the RAID authorization system has revoked access of a first user in the first set of users to the RAID controller; and maintaining, by the knowledge share, the first user as a current user until expiration of a preset period of time after receiving the notification.

18. The system of claim 15, wherein the method further comprises:

receiving, by the RAID controller, a request to retrieve the first data and the second data;

sending, by the RAID controller, a request for the first data to the first non-routable IP address;

sending, by the RAID controller, a request for the second data to the second non-routable IP address;

translating, by the NAT system, the first non-routable IP address into the first routable IP address for the first storage location and the second non-routable IP address into the second routable IP address for the second storage location;

sending, by the NAT system, the request for the first data to the first routable IP address and the request for the second data to the second routable IP address via the wide area network (WAN);

receiving, by the NAT system, the first data and the second data;

sending, by the NAT system, the first data and the second data to the RAID controller; and providing, by the RAID controller, the first data and the second data.

* * * * *